Nov. 23, 1937.  J. L. CREVELING  2,100,069

LUBRICATING DEVICE

Filed Sept. 25, 1935

INVENTOR
JOHN L. CREVELING.
BY
*John A. Watson*
ATTORNEY

Patented Nov. 23, 1937

2,100,069

UNITED STATES PATENT OFFICE 2,100,069

LUBRICATING DEVICE

John L. Creveling, Tucson, Ariz., assignor to The Lubrication Corporation, Chicago, Ill., a corporation of Delaware Application September 25, 1935, Serial No. 42,018

1 Claim. (Cl. 285—92)

This invention relates to lubricating devices and more particularly to jointed swivel connectors which form conduits for use with high pressure lubrication equipment.

In lubrication equipment a great deal of difficulty has been encountered in obtaining a conduit sufficiently strong to withstand the extremely high pressures employed and at the same time sufficiently flexible to permit of ease of manipulation. Difficulty has also been encountered in providing a conduit having sufficient flexibility, that is, capable of bending on a short enough radius, to reach fittings to be serviced around obstructions or in relatively inaccessible places.

One of the objects of the present invention is to provide a conduit for high pressure lubrication which overcomes the above mentioned difficulties and which is sufficiently strong to withstand extremely high pressures, sufficiently flexible to permit easy manipulation, and quickly adjustable to reach into otherwise inaccessible or difficultly accessible places.

A further object is to provide a novel connector which combines free swiveling and limited angular movement and which is capable of assuming substantially any desired position.

A further object is to provide a novel connector in which the parts may be assembled and taken apart readily or which may be connected in series with other elements to form a conduit of any desired length.

According to one desirable arrangement embodying the invention a jointed swivel connector may be composed of one or more male elements having enlarged head portions connected by rigid stems and one or more rigid female elements for connecting such male elements. The female elements preferably comprise cylinders joined at their open ends and having their outer ends closed except for slots extending partly across the ends and partly up the adjacent sides. Pistons are mounted in the cylinders and preferably have their outer ends cut parallel to a line joining the ends of the slots, there being sockets in the outer ends of the pistons communicating with passages extending therethrough.

The male and female elements are assembled with the stems of the male elements extending through the slots in the ends of the cylinders which form, in effect, jaws for engaging the male element heads. The pistons are urged outwardly by fluid pressure which may, if desired, be supplemented or initiated with springs so that the sockets engage the heads to form fluid tight joints therewith. In this position the male elements can pivot about the sockets, the stems moving in the slots and can swivel in the sockets about their own axis, the joint formed by the heads and sockets permitting such movement without leakage.

In order to facilitate ease of assembly or repair, the cylindrical members, according to one modification, may be provided with enlarged openings through which the male element heads will pass, and jaws to engage the heads. This arrangement provides a quick-detachable joint enabling the male and female elements to be assembled or taken apart readily while retaining all advantages of a more permanent joint.

It will be apparent, that if desired, a number of connectors can be joined in series to form a conduit of any desired length.

Other objects and novel features of the invention will appear from the following detailed description when taken in connection with the accompanying drawing wherein like reference numerals indicate like parts throughout the several views and in which.

Figure 1:
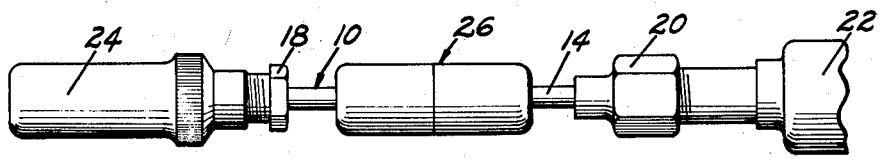
Fig. 1 is a view of a connector embodying the invention.

Referring more particularly to the drawing there is shown a high pressure lubricant connector embodying the invention constituted by male elements 10 having enlarged heads 12 of spherical form and rigid stems 14, there being a lubricant passage through each stem and head. The heads may be formed integral with the stems or may be formed separately and connected thereto by screw threads as indicated at 16 or each element may include two heads, one integral and the other screw threaded. Where only one connector is employed as shown in Fig. 1, the outer ends of the elements 10 are secured to suitable threaded connections 18 and 20 for connection with any suitable source of lubricant supply indicated generally at 22 and a discharge nozzle 24. The source of supply 22 may be any desired type of portable grease gun or may be a conduit leading from a relatively stationary type of pump. The discharge nozzle may be of any desired type but as shown is one adapted for quick-detachable connection to a lubricant fitting.

Figure 2:
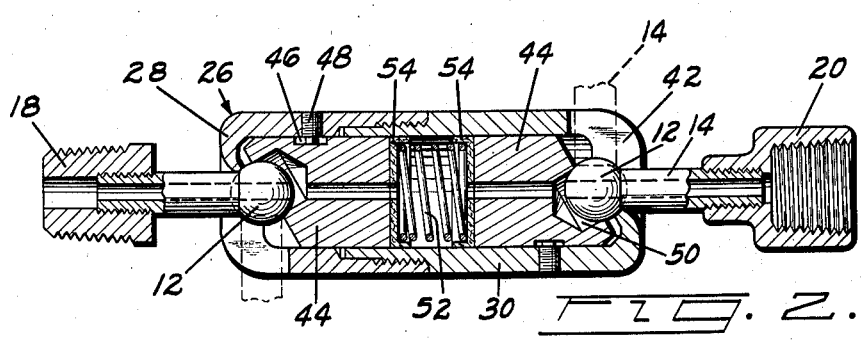
Fig. 2 is a sectional view of the connector of Fig. 1 with parts in elevation.

The male elements 10 are joined by female elements indicated generally at 26 which comprise open ended cylindrical members 28 and 30 joined at their open ends. As shown in Fig. 2, member 30 has a reduced portion which is externally screw threaded and member 28 is counter-bored complementary and similarly threaded so that the two members may be connected. When assembled the members 28 and 30 present a substantially smooth inner cylindrical surface.

Figure 3:
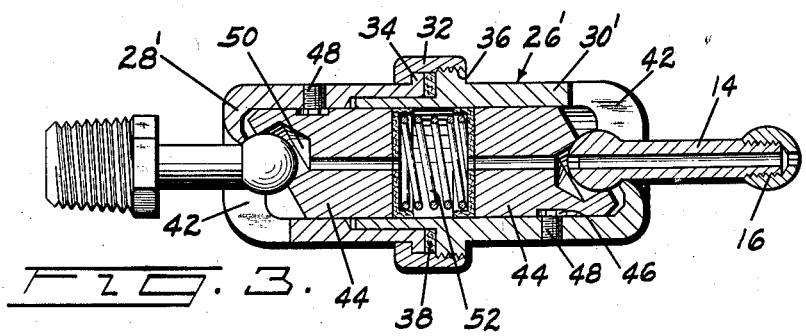
Fig. 3 is a view similar to Fig. 2 but showing a slightly modified form.

In the modification of Fig. 3 the members 28' and 30' of the female element 26' are connected by means of a sleeve nut 32 rotatably engaging a shoulder 34 on sleeve 28' and screw threaded onto a suitable flange 36 formed on member 30'. If desired, a washer 38 may be inserted between the shoulder 34 and flange 36 to provide an anti-friction wearing surface for swiveling movement of the members 28' and 30'.

Figure 4:
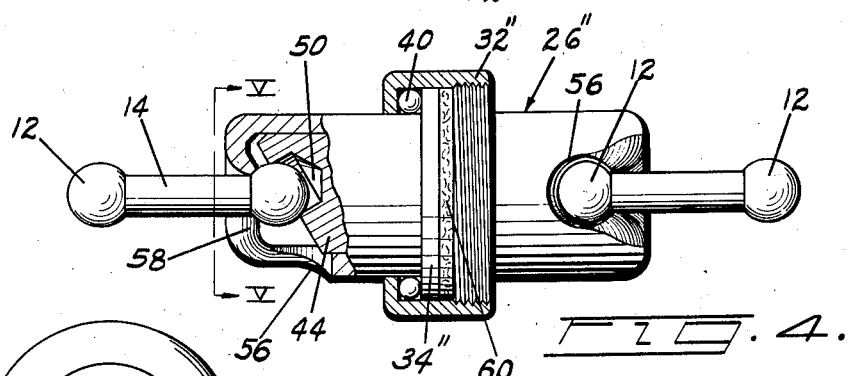
Fig. 4 is a view of still another modified form with parts in section.
Figure 5:
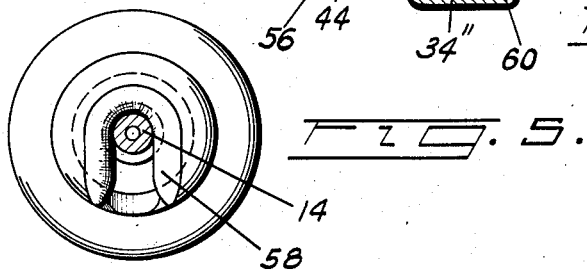
Fig. 5 is a view taken substantially on the line V—V of Fig. 4.

The female element 26" shown in Fig. 4 is similar to the element 26' except that a series of anti-friction balls 40 are inserted between sleeve nut 32" and shoulder 34" to facilitate relative rotation therebetween. In the forms shown in Figs. 3 and 4 the two parts of the female element are relatively rotatable to permit a swivelling action. In the form of Fig. 4 the heads 12 may all be integral with the stems since the heads may be snapped into or out of the sockets in the couplers, and, if desired chains of elements of this type may be coupled to provide a flexible hose. Also this form of Fig. 4 may embrace another series of anti-friction devices, such as balls, which may be substituted for the anti-friction washer 60.

Each cylindrical member 28 and 30 is provided with a slot 42 extending partially across its outer end and partially along one side as best shown in Figs. 2 and 3. The width of these slots is only slightly greater than the diameter of stems 14 and is less than the diameter of heads 12 so that the stems can pass through the slots but the heads will be held by the sides thereof.

Opposed pistons 44 are mounted in the female elements, each having a longitudinal bore communicating with a space left therebetween, and faced with cup leathers 54 to provide a seal between the pistons and bores. The outer faces of these pistons are cut at an angle so that, when mounted in the cylindrical members, such faces substantially parallel a line connecting the ends of slots 42. The pistons are provided with grooves 46 in their outer surfaces and set screws 48 extend through the cylindrical members into these grooves to maintain the pistons in the proper radial position in the cylinders.

A suitable socket 50 is formed in the outer face of each piston, in communication with the bore therethrough and of proper size and shape to form a lubricant tight joint with the heads 12. It will be noted that due to the spherical shape of the head and the circular outline of the socket a fluid tight seal will be formed in substantially any relative angular position of the socket and head which is permitted by the jaws.

The various parts are assembled by extending the stems 14 through the slots 42 with the parts of the body member disconnected and then connecting the cylindrical members with the pistons in place. The threaded connections 18 and 20 may be secured to the outer ends of the elements 10 and to the supply source 22 and nozzle 24, and the connector is ready for use. It will be apparent that the nozzle can be moved through substantially any desired angle with respect to the supply source by pivoting the elements 10 about the sockets and by swiveling them about their own axis. A further degree of flexibility is afforded in the modifications of Figs. 3 and 4 by relative swiveling of the parts of the body member. Since all parts of the connector are rigid it can be made of any desired size to provide the required strength and since the joints formed by the heads and sockets are freely operable, extreme ease of operation is obtained at all times.

Where greater length is desired than that of one connector, other connectors may be assembled in series by substituting a spherical head such as 16 in Fig. 3 for one or both of the connections 18 and 20 and assembling other body members on these heads. In order to facilitate assembly the heads 12 and 16 may be provided with square holes or holes of some shape other than round which can be engaged by suitable tools for threading the parts together. In this way any desired number of connectors may be assembled in series to provide any desired length, even to the extent of forming a relatively long conduit to replace the usual flexible conduits employed with stationary lubricant pumps. It might also be desirable in some cases to provide a spherical head on the outer end of one element and a threaded connection on the outer end of the other element so that the spherical head could be coupled to the usual coupler on a grease gun and another coupler or nozzle secured to the threaded connection. In this way the connector could readily be attached to and detached from an existing grease gun without the use of tools and without disturbing the operation of the grease gun.

Referring to Fig. 4 there is shown a modified construction in which a quick detachable connection can be made between the male and female elements. In this arrangement each cylindrical member is provided with an enlarged opening 56, preferably on its side, which is large enough to permit passage of the head 12. This opening narrows toward the end of the member and runs into a slot 58 of less width than the head extending partially across the end of the member. Thus the head can be forced through the opening 56 into the cylindrical member where it will be gripped by the sides of slot 58 which form, in effect, jaws against which the head is held by piston 44. The spring 52 urges the piston outwardly with sufficient force to hold the head against the jaws to prevent accidental uncoupling, it being necessary to overcome the force of the spring to insert or withdraw the head, and when there is pressure on the conduit, the piston is urged outwardly with sufficient force to prevent any uncoupling.

By this construction the male elements 10 can be connected readily to the female elements 26 and can be as readily taken apart or any one element which is defective can be replaced without the necessity for replacement of the entire connector. This arrangement is also useful where several connectors are used in series, permitting rapid and easy building up of a conduit of any desired length.

While several embodiments of the invention have been shown and described, it will be understood that the same is not limited thereto but might be embodied in other forms. Reference will, therefore, be had to the appended claim to determine the scope of the invention.

I claim:

A connector for the ends of two pipe sections comprising swivelly connected shell portions, each of said portions having a slot in its end for engaging with a pipe section, said slot being so arranged as to provide for angular movement of the connected section through substantially 90° while limiting such angular movement to a single plane.

JOHN L. CREVELING.